US010226838B2

(12) United States Patent
Nomura et al.

(10) Patent No.: US 10,226,838 B2
(45) Date of Patent: Mar. 12, 2019

(54) LASER LIGHT IRRADIATION APPARATUS AND LASER PEENING TREATMENT METHOD

(71) Applicant: KABUSHIKI KAISHA TOSHIBA, Minato-ku (JP)

(72) Inventors: Kota Nomura, Yokohama (JP); Itaru Chida, Kawasaki (JP); Katsunori Shiihara, Yokohama (JP); Hiroya Ichikawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 587 days.

(21) Appl. No.: 15/080,866

(22) Filed: Mar. 25, 2016

(65) Prior Publication Data

US 2016/0288258 A1  Oct. 6, 2016

(30) Foreign Application Priority Data

Apr. 3, 2015 (JP) .................................. 2015-076832
Sep. 29, 2015 (JP) .................................. 2015-190715

(51) Int. Cl.
*B23K 26/146* (2014.01)
*B23K 26/356* (2014.01)
(Continued)

(52) U.S. Cl.
CPC ........ *B23K 26/146* (2015.10); *B23K 26/0066* (2013.01); *B23K 26/0069* (2013.01);
(Continued)

(58) Field of Classification Search
CPC .............. B23K 26/146; B23K 26/0066; G02B 6/3624; G02B 6/32
(Continued)

(56) References Cited

U.S. PATENT DOCUMENTS 4,694,828 A * 9/1987 Eichenbaum ........... A61F 9/008
606/6
4,950,266 A * 8/1990 Sinofsky ................ A61B 18/24
606/15
(Continued)

FOREIGN PATENT DOCUMENTS

CN 102837127 A 12/2012
JP 2003-53533 A 2/2003
(Continued)

OTHER PUBLICATIONS

Extended European Search Report dated Aug. 25, 2016 in Patent Application No. 16162994.4.

*Primary Examiner* — Samuel M Heinrich
(74) *Attorney, Agent, or Firm* — Oblon, McClelland, Maier & Neustadt, L.L.P.

(57) ABSTRACT

An embodiment is to provide a laser light irradiation apparatus and a laser peening treatment method, by which even a member to be processed, existing in a narrow portion, can be easily processed by laser peening. The laser light irradiation apparatus 1 according to the embodiment includes: an optical fiber 2 through which laser light is guided; a condensing lens 3 that is placed on one end of the optical fiber, the condensing lens and the optical fiber defining the light path of the laser light; a guide 4 that retains the optical fiber; and a movement mechanism 5 for changing the position of the optical fiber, wherein the light path of the laser light guided through the optical fiber is emitted at an angle changed to more than 0° and less than 90° with respect to the central axis of the optical fiber by the condensing lens.

11 Claims, 6 Drawing Sheets

(51) Int. Cl.
*G02B 6/36* (2006.01)
*G02B 6/32* (2006.01)
*B23K 26/352* (2014.01)
*B23K 26/00* (2014.01)
*B23K 26/06* (2014.01)
*G02B 6/42* (2006.01)

(52) U.S. Cl.
CPC ........ *B23K 26/0648* (2013.01); *B23K 26/352* (2015.10); *G02B 6/32* (2013.01); *G02B 6/3624* (2013.01); *G02B 6/4296* (2013.01)

(58) Field of Classification Search
USPC ............... 219/121.6, 121.75, 121.84, 121.85
See application file for complete search history.

(56) References Cited

U.S. PATENT DOCUMENTS

| | | | | |
|---|---|---|---|---|
| 5,029,581 A | * | 7/1991 | Kaga | A61N 5/0616 607/89 |
| 6,134,003 A | * | 10/2000 | Tearney | A61B 1/00096 356/479 |
| 6,163,012 A | * | 12/2000 | Kimura | B23K 26/106 219/121.63 |
| 7,022,938 B2 | | 4/2006 | Tamura et al. | |
| 7,118,293 B2 | * | 10/2006 | Nagasaka | G02B 6/4214 385/89 |
| 9,186,751 B2 | | 11/2015 | Chida et al. | |
| 2003/0029845 A1 | | 2/2003 | Tamura et al. | |
| 2010/0116801 A1 | | 5/2010 | Mukai et al. | |
| 2012/0325790 A1 | | 12/2012 | Chida et al. | |

FOREIGN PATENT DOCUMENTS

| | | |
|---|---|---|
| JP | 2004-61887 A | 2/2004 |
| JP | 2004-258387 A | 9/2004 |
| JP | 2008-170471 A | 7/2008 |
| JP | 2009-072280 A | 4/2009 |
| JP | 2011-064503 A | 3/2011 |
| JP | 2013-006182 A | 1/2013 |
| JP | 2013-141701 A | 7/2013 |
| KR | 10-2013-0028632 A | 3/2013 |

* cited by examiner

LASER LIGHT IRRADIATION APPARATUS AND LASER PEENING TREATMENT METHOD

CROSS-REFERENCE TO RELATED APPLICATIONS

This application is based upon and claims the benefit of priority from the prior Japanese Patent Application Nos. 2015-076832, filed on Apr. 3, 2015, and 2015-190715, filed on Sep. 29, 2015 the entire contents of which are incorporated herein by reference.

FIELD

Embodiments of the present invention relate to a laser light irradiation apparatus and a laser peening treatment method.

BACKGROUND

In nuclear power generation facilities, automatic instruments have been installed in furnaces, the instruments in the furnaces have been accessed, and various maintenance treatments have been carried out, during periodic inspections. Laser processing methods and apparatuses, by which stress corrosion cracking (SCC) caused by tensile stresses remaining in welds can be effectively prevented from occurring, have been especially proposed as countermeasures against SCC. In particular, one of such laser processing methods is laser peening.

The laser peening is a metal surface treatment method carried out for improving the fatigue strength, abrasion resistance, corrosion resistance, and/or the like of a metal apparatus or the like. In the method, a surface of a metal is irradiated with pulse laser light, a shock wave generated in the irradiation propagates into the interior of the metal, and a more dynamic stress due to the shock wave than the yield stress of the metal results in plastic deformation. As a result, texture deformation or the like occurs in the interior of the metal, and a compressive residual stress is applied.

Metal surface treatment by such laser peening will be described specifically. First, a surface of a metal member as a member to be treated is irradiated with pulse laser light. In this case, for example, light is condensed on a spot having a diameter of around 1 mm through a condensing lens using a laser beam having a pulse width of around several nanoseconds (ns), and the metal member is irradiated with the light. The irradiation allows the surface of the metal member to absorb energy and to become plasma. When the surface of the metal member is covered with a liquid transparent to the wavelength of the laser beam, the liquid prevents the generated plasma from expanding to increase the internal pressure of the plasma. The pressure reaches, for example, around several gigapascals (GPa). The pressure shocks the member to then generate a strong shock wave. The shock wave propagates into the interior of the metal member to cause plastic deformation to apply a compressive residual stress.

Laser peening has the features of having a peening effect that is more insusceptible to material strength and the like than the peening effect of other peening such as shot peening or water jet peening, and that reaches the interior having a depth of around 1 mm from a surface of a member to be treated. The laser peening also has the features of hardly causing a reaction force to be generated during processing, and of allowing a processing apparatus to be easily downsized to result in excellent processability in a narrow portion.

However, it may be difficult to apply laser peening to the interior of a member to be treated having only very narrow space. For example, a nozzle is joined to the upper lid of a pressure vessel of a pressurized water reactor by welding, and a thermal sleeve is inserted into the interior of the nozzle. Even when laser peening has been intended to be applied to a spot in which such a nozzle is welded, only a gap of, for example, around 3 mm has existed between the inner surface of the nozzle and such a thermal sleeve, and therefore, it has been difficult to perform working in such a narrow portion using conventional laser peening.

For example, there is an idea that an optical fiber and/or the like are used in order to guide laser light to such a narrow portion; however, since laser light with which irradiation is performed from the leading edge of the optical fiber is subjected to irradiation in the axial direction of the optical fiber, change of a light path is required for irradiating a member to be treated, located in parallel to the insertion direction of the optical fiber, with laser light with which the irradiation is performed from the optical fiber. Thus, an apparatus in which a coreless fiber with a curved surface is connected to an end face of an optical fiber, and laser light with which irradiation is performed from the optical fiber is condensed in a direction perpendicular to the axial direction of the optical fiber has been proposed as a method for irradiating a surface of the member to be treated of such a narrow portion with laser light.

However, since the distance between the central axis of the optical fiber and a member to be processed is short as in the case of a narrow portion, an insufficient distance for condensing light can be made to result in a lower generated shock wave even when it is intended to condense light in a direction perpendicular to the axial direction of the optical fiber. In general, the energy of a shock wave generated by irradiation of laser light becomes maximum in a portion located immediately above a site irradiated with light. Therefore, irradiation with laser light in the perpendicular direction from the leading edge of the optical fiber allows the leading edge of the optical fiber to receive a shock wave having large energy, and therefore enables the leading edge of the optical fiber to be damaged.

DETAILED DESCRIPTION

A laser light irradiation apparatus according to an embodiment includes: an optical fiber through which laser light is guided; a condensing lens that is placed on one end of the optical fiber, said condensing lens and said optical fiber defining the light path of said laser light; a guide that retains said optical fiber; and a movement mechanism for changing the position of said optical fiber, wherein the light path of said laser light guided through said optical fiber is emitted at an angle changed to more than 0° and less than 90° with respect to a central axis of said optical fiber by said condensing lens.

Embodiments will now be explained with reference to the accompanying drawings.

First Embodiment

Figure 1:
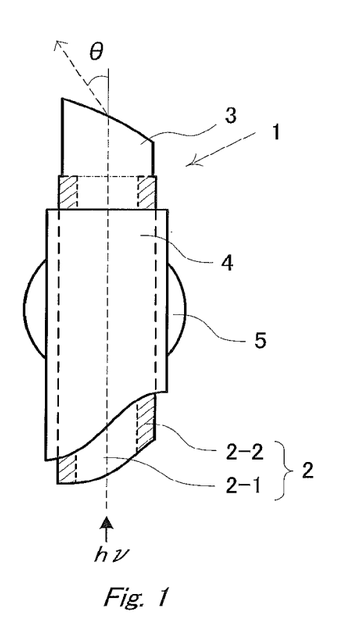
FIG. 1 is a schematic cross-sectional view illustrating a laser light irradiation apparatus according to a first embodiment.

A laser light irradiation apparatus according to a first embodiment will be described with reference to the drawings. In FIG. 1, a view of from the laser oscillator of the laser light irradiation apparatus to the middle of an optical fiber is omitted, and only a portion from the middle of the optical fiber to an end face for light irradiation is illustrated. FIG. 1 is a schematic cross-sectional view illustrating the laser light irradiation apparatus according to the first embodiment. As illustrated in FIG. 1, the laser light irradiation apparatus 1 includes: an optical fiber 2 through which laser light, such as pulse laser or pulsed laser, is guided; a condensing lens 3 that is placed on one end of the optical fiber 2, the condensing lens 3 and the optical fiber 2 defining the light path of laser light with which irradiation is performed from a laser oscillator; a guide 4 that retains the optical fiber 2; and a movement mechanism 5 for changing the position of the optical fiber 2. In the present embodiment, the condensing lens 3 is joined to the end face of the one end of the optical fiber 2. Laser light may be other than pulse laser or pulsed laser, such as continuous laser.

The optical fiber 2 includes a fiber core 2-1 through which the light path of laser light passes, and a clad 2-2 that covers the fiber core 2-1. Quartz, multicomponent glass, or the like is used as a material with which the fiber core 2-1 is formed. Quartz, silicone, a fluorine-containing polymer, multicomponent glass, or the like is used as a material with which the clad 2-2 is formed. In order to adjust the refractive index of the fiber core 2-1 or the clad 2-2, it is also possible to add germanium or phosphorus to the fiber core 2-1, or to add boron or fluorine to the clad. It is also possible to use a plastic optical fiber in which a polymer such as polymethyl methacrylate, polycarbonate, or polystyrene is used in the fiber core 2-1, and a fluorine-containing polymer is used in the clad 2-2. In the present embodiment, the structure of the optical fiber 2 is not limited as long as laser light can be guided through the optical fiber 2.

The thickness and the like of the optical fiber 2 are not particularly limited, and the smaller diameter of the optical fiber 2 is preferred for using the laser light irradiation apparatus 1 in processing of a narrow portion. In contrast, the larger diameter of the optical fiber 2 is preferred for irradiation with stronger laser light. Thus, the diameter of optical fiber 2 is preferably 1 to 5 mm, more preferably 1.2 to 3 mm, from the viewpoint of using the laser light irradiation apparatus 1 in processing of a narrow portion and of enabling irradiation with stronger laser light.

The condensing lens 3 is joined to the end face for irradiation with laser light of the optical fiber 2 by adhesion or fusion. For example, a condensing lens including a part of an optical lens having a diameter that is larger than the diameter of the fiber core 2-1 of the optical fiber 2 can be used as the condensing lens 3. A material such as the above-described material of the fiber core 2-1 of the optical fiber 2 can be used as a material with which the condensing lens 3 is formed. It is desirable to use sapphire glass ($Al_2O_3$), diamond, or the like as the material of the condensing lens 3 from the viewpoint of improving durability against a shock wave generated in irradiation with laser light.

A laser oscillator (not illustrated) as a light source for laser light is coupled to the other end face (not illustrated) of the optical fiber 2. In the present embodiment, the laser oscillator emits laser light such as pulse laser or pulsed laser in order to utilize the laser light irradiation apparatus 1 in laser peening. However, laser light other than pulse laser light may be emitted in the case of using the laser light irradiation apparatus 1 in applications and/or the like other than laser peening.

The light path of laser light from the laser light irradiation apparatus 1 is controlled mainly by the optical fiber 2 and the condensing lens 3. Laser light travels in the fiber core 2-1 of the optical fiber 2 while being reflected by the interface between the fiber core 2-1 and the clad 2-2. Ordinarily, irradiation with light from the optical fiber is performed while being diffused due to reflection occurring in the fiber core 2-1. Thus, the condensing lens 3, which is disposed on the end face for irradiation with laser light of the optical fiber 2, allows the light beams of laser light from the optical fiber 2 to be parallel to each other or to converge. In this case, irradiation with laser light is ordinarily performed in a direction along the central axis of the optical fiber 2, and therefore, the axis of the optical fiber 2 and the optical axis of the condensing lens 3 are commonly allowed to correspond with each other.

In the present embodiment, the condensing lens 3 is joined and disposed to the optical fiber 2 so that the optical axis of the condensing lens 3 is prevented from corresponding with the central axis of the optical fiber 2. As a result, the direction of emitting laser light does not correspond with the central axis of the optical fiber 2 due to the difference between the refractive indices of the condensing lens 3 and the outside thereof, e.g., air. Assuming that an angle (inclination angle) between the travelling direction of laser light with which irradiation is performed in this case and the central axis of the optical fiber 2 is θ, the inclination angle θ is more than 0° and less than 90° (0<θ<90°), preferably 10<θ<80°, in the present embodiment. In other words, in the present embodiment, the light path of laser light guided through the optical fiber 2 is emitted at an angle changed to more than 0° and less than 90° with respect to the central axis of the optical fiber 2 by the condensing lens 3. In contrast, the inclination angle θ is 0° in the case of a common light guiding apparatus. In this case, laser light is emitted onto the central axis of an optical fiber, and therefore, it is impossible to process a face deviating from the extension of the central axis of the optical fiber in a narrow portion. When the inclination angle θ is more than 10°, the member to be processed of the narrow portion can be irradiated effectively. The inclination angle θ is 90° in the case of an apparatus of performing irradiation with light in a perpendicular direction. In this case, the laser light irradiation apparatus may be damaged due to the energy of a shock wave generated by irradiation with laser light. It is difficult to set the inclination angle θ at 90° or more in the case of utilizing refraction of light. The possibility of damaging the laser light irradiation apparatus due to the energy of a shock wave can be reduced at an inclination angle θ of less than 80°.

The inclination angle θ and focal length of laser light with which irradiation is performed can be adjusted by optimizing the curvature of the exit face of the condensing lens 3 or the deviation between the optical axis of the condensing lens 3 and the central axis of the optical fiber 2. For allowing the inclination angle θ to be greater, it is preferable to select the materials of the optical fiber core 2-1 and the condensing lens 3 so that $n1 \geq n2 > n3$ or $n1 > n2 \geq n3$ is satisfied assuming that the refractive indices of the fiber core 2-1, the condensing lens 3, and an environment in which irradiation with light is performed (commonly, air) are n1, n2, and n3, respectively.

In the present embodiment, the laser light irradiation apparatus 1 includes the guide 4 and the movement mechanism 5 to prevent damage and/or the like to the optical fiber 2 when the light irradiation portion of the laser light irradiation apparatus 1 is moved to enable a narrow portion to be processed by laser peening.

A material with which the guide 4 is formed can be optionally selected depending on a purpose, and a material with relatively high hardness, for example, a metal, an alloy, a rigid plastic, or the like can be used to impart rigidity to the optical fiber 2. It is preferable to form the guide 4 with a non-rigid plastic which is flexible, or the like in a case in which it is necessary to insert the optical fiber 2 deeply into a narrow portion.

The movement mechanism 5 is intended to move the optical fiber 2 to the vicinity of a member to be treated. The configuration of the movement mechanism 5 is not particularly limited as long as the movement mechanism 5 can move the optical fiber 2. For example, a movement mechanism that is equipped with a power and a driving wheel, and can move by itself in a narrow portion, or the like can be used. In this case, the movement mechanism 5 can move a position, at which the member to be treated is irradiated with laser light, in an upward and downward direction or in a crosswise direction. Even when the movement mechanism 5 in itself is not equipped with any driving wheel or the like, the end opposite to the light irradiation side of the optical fiber 2 can be controlled to control the position of the leading edge of the optical fiber 2 in a case in which the guide 4 has rigidity. In this case, it is preferable that the movement mechanism 5 is formed with a member including a low friction material which reduces the friction between the laser light irradiation apparatus 1 and the inner surface of the narrow portion. It is also acceptable to form the guide 4 with a low friction material to also impart the guide 4 with the functions of the movement mechanism 5.

Figure 2:
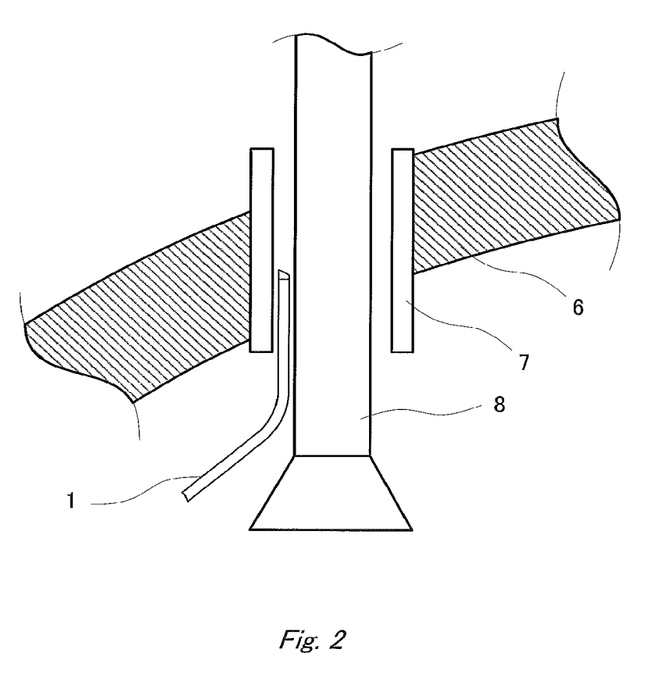
FIG. 2 is an explanatory drawing illustrating a state in which a laser light irradiation apparatus is applied for processing a nuclear reactor core internal structure.

FIG. 2 is an explanatory drawing illustrating a state in which the laser light irradiation apparatus according to the present embodiment is applied for processing a nuclear reactor core internal structure. As illustrated in FIG. 2, a thermal sleeve 8 is inserted into the nozzle 7 of an upper lid 6 in the nuclear reactor. The upper lid 6 and the nozzle 7 are joined to each other by welding. In the nuclear reactor, a distortion is easily created, for example, in the joint between the upper lid 6 and the nozzle 7 due to a general change in temperature. It is necessary to perform treatment for eliminating such distortion in the periodic inspections of the nuclear reactor. However, the thermal sleeve 8 is inserted into the nozzle 7, and only a very narrow gap of, e.g., around 3 mm is present between the nozzle 7 and the thermal sleeve 8. Thus, a method of processing from the outside of the upper lid 6 has been examined. However, it is difficult to obtain a sufficient effect by the method.

There is also an idea that the thermal sleeve 8 is removed; however, the treatment thereof requires trouble and time. The laser light irradiation apparatus 1 enables processing by laser peening in the state of attaching the thermal sleeve 8 because a leading edge of the optical fiber 2 can be inserted into a narrow portion such as the portion between the nozzle 7 and the thermal sleeve 8.

Figure 3:
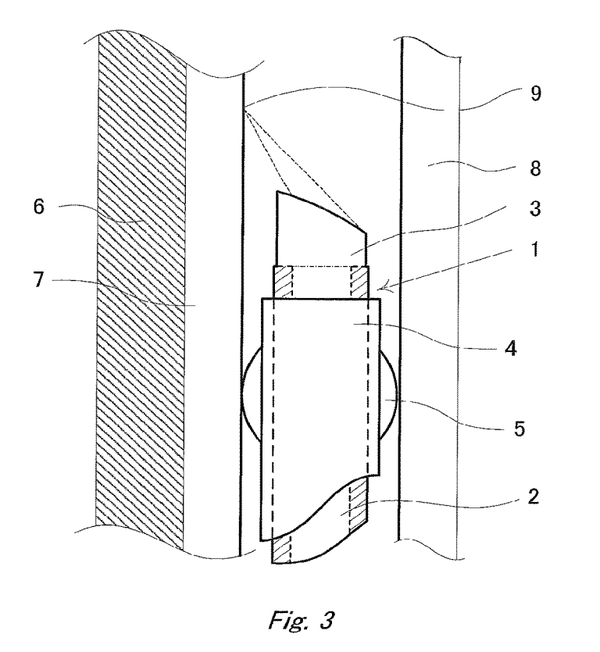
FIG. 3 is an expanded conceptual diagram of a light irradiation portion in FIG. 2.

FIG. 3 is an expanded conceptual diagram of a light irradiation portion in FIG. 2. The position of the laser light irradiation apparatus 1 inserted between the nozzle 7 and the thermal sleeve 8 can be adjusted by the movement mechanism 5, and the laser light irradiation apparatus 1 can irradiate a portion 9 to be treated with laser light. The irradiation with the laser light is performed through the interior of the optical fiber 2, the laser light is condensed by the condensing lens 3, and the irradiation angle of the laser light is adjusted.

Thus, in accordance with the present embodiment, the laser light irradiation apparatus 1 enables processing by laser peening in the state of attaching the thermal sleeve 8 because the irradiation angle of laser light can be adjusted in a state in which the laser light irradiation apparatus 1 is inserted into a narrow portion.

Second Embodiment

A laser light irradiation apparatus according to a second embodiment will be described with reference to the drawings. Members having functions similar to those in the embodiment described above are denoted by the same reference characters, and the detailed descriptions thereof are omitted.

Figure 4:
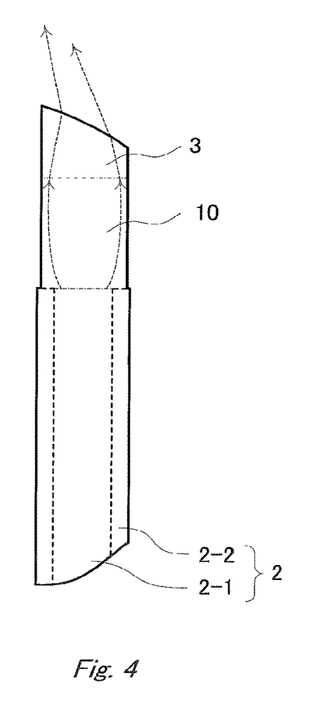
FIG. 4 is a schematic cross-sectional view illustrating a laser light irradiation apparatus according to a second embodiment.

FIG. 4 is a schematic cross-sectional view illustrating the laser light irradiation apparatus according to the second embodiment. As illustrated in FIG. 4, an optical fiber lens 10 is disposed between the light emission end of an optical fiber 2 and a condensing lens 3 in the present embodiment.

A material with which the optical fiber lens 10 is formed is not particularly limited. The optical fiber lens 10 is configured to control the distribution of a refractive index so that the refractive index increases from the central axis of the optical fiber 2 to the outer periphery of the optical fiber 2.

Laser light emitted from the optical fiber 2 is guided into the fiber core 2-1 of the optical fiber 2, and is emitted at a predetermined spread angle from the light emission end of the optical fiber 2. In the present embodiment, the optical fiber lens 10 is disposed between the light emission end of the optical fiber 2 and the condensing lens 3, whereby light emitted from the optical fiber 2 is enabled to be parallel light, or condensed laser light can be guided to the condensing lens 3.

Thus, in accordance with the present embodiment, laser light emitted from the light emission end of the optical fiber 2 can be condensed into the optical fiber lens 10 before the light is condensed into a single condensing lens, and therefore, laser light emitted from the optical fiber 2 can be effectively condensed to improve the efficiency of treatment by laser peening even in a case in which the spread angle of the laser light is large, or in which it is necessary to reduce a focal length.

Third Embodiment

A laser light irradiation apparatus according to a third embodiment will be described with reference to the drawings. Members having functions similar to those in the embodiments described above are denoted by the same reference characters, and the detailed descriptions thereof are omitted.

Figure 5:
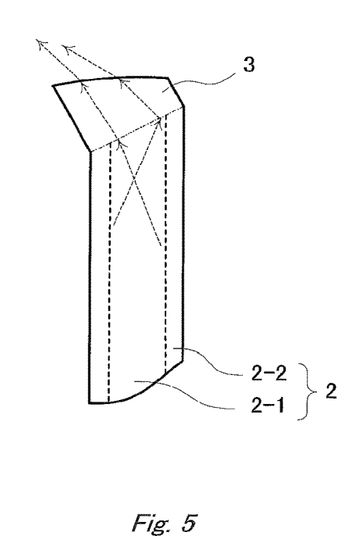
FIG. 5 is a schematic cross-sectional view illustrating a laser light irradiation apparatus according to a third embodiment.

FIG. 5 is a schematic cross-sectional view illustrating a laser light irradiation apparatus according to a third embodiment. As illustrated in FIG. 5, an end face of an optical fiber 2 is obliquely cut, and a condensing lens 3 is joined to the cut inclined end face, in the present embodiment. Such a structure results in an increased light emission angle θ with respect to the optical fiber and in a decreased distance through which light passes from the end face of the optical fiber to a condensing position, whereby a portion 9 to be processed can be irradiated with laser light having larger energy.

It is preferable to select a material for configuring such a structure as appropriate in consideration of a refractive index. Specifically, it is preferable to configure such a structure so that n1>n2≥n3 is satisfied assuming that the refractive indices of an optical fiber core 2-1, the condensing lens 3, and an environment in which light is emitted are n1, n2, and n3, respectively. By controlling the refractive indices in such a manner, laser light passing through the boundary between the light irradiation end face of the optical fiber 2 and the condensing lens 3 is greatly refracted due to the differences between the refractive indices of the respective materials, and the emission angle θ of the laser light can be increased.

Thus, in accordance with the present embodiment, a light emission angle θ with respect to the optical fiber 2 is increased by joining the condensing lens 3 to the inclined end face of the optical fiber 2, whereby the performance of condensing laser light emitted from the optical fiber 2 can be improved, the inclination angle of laser light emitted from the optical fiber 2 can be increased, and therefore, the efficiency of treatment by laser peening can be improved.

In the present embodiment, the phenomenon of refraction in the boundary between the optical fiber 2 and the condensing lens 3 is used. However, the second embodiment can also be combined with the third embodiment. In other words, the end face of the optical fiber lens 10 can be polished to be inclined, and can be then coupled with the condensing lens 3, in the boundary portion between the optical fiber lens 10 and the condensing lens 3 in the second embodiment. Such a combination can result in a further excellent effect.

Fourth Embodiment

A laser light irradiation apparatus according to a fourth embodiment will be described with reference to the drawings. Members having functions similar to those in the embodiments described above are denoted by the same reference characters, and the detailed descriptions thereof are omitted.

Figure 6:
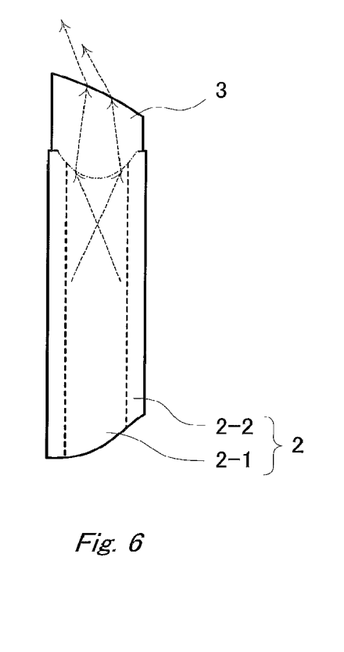
FIG. 6 is a schematic cross-sectional view illustrating the configuration of a laser light irradiation apparatus according to a fourth embodiment.

FIG. 6 is a schematic cross-sectional view illustrating the configuration of the laser light irradiation apparatus according to the fourth embodiment. In the present embodiment, a condensing lens 3 processed to fit with a concave shape formed by cutting an end face of an optical fiber 2 into a spherical surface is joined in combination.

Such a structure can also result in an increased light emission angle θ with respect to the optical fiber and in a decreased distance through which light passes from the end face of the optical fiber to a condensing position, and therefore enables a portion 9 to be processed to be irradiated with laser light having larger energy.

In a method for joining the optical fiber 2 and the condensing lens 3 having the structures to each other, for example, the end face of the optical fiber 2 may be processed, and the condensing lens fitting with the shape of the end face may be allowed to adhere, or the processed end face of the optical fiber 2 may be fused with resin or the like, as the raw material of the condensing lens 3, in a molten state, and the surface thereof may be then formed by being subjected to cutting, polishing, and the like to have the shape of the condensing lens 3.

It is also preferable to select a material for configuring such a structure as appropriate in consideration of a refractive index. It is preferable to configure such a structure so that n1>n2≥n3 is satisfied assuming that the refractive indices of the optical fiber 2, the condensing lens 3 including a portion inserted into a concave portion, and an environment in which light is emitted are n1, n2, and n3, respectively. By controlling the refractive indices in such a manner, laser light passing through the boundary between the light irradiation end face of the optical fiber 2 and the condensing lens 3 is greatly refracted due to the differences between the refractive indices of the respective materials, and the emission angle θ of the laser light can be increased.

Thus, in the present embodiment, a light emission angle θ with respect to the optical fiber 2 can also be increased by using the optical fiber 2 and the condensing lens 3 formed as described above. Therefore, in accordance with the present embodiment, the efficiency of treatment by laser peening can be further improved because the performance of condensing laser light emitted from the optical fiber 2 can be improved, and the inclination angle of laser light emitted from the optical fiber 2 can be increased even when laser light having a predetermined spread angle is emitted from the light emission end of the optical fiber 2.

Figure 7:
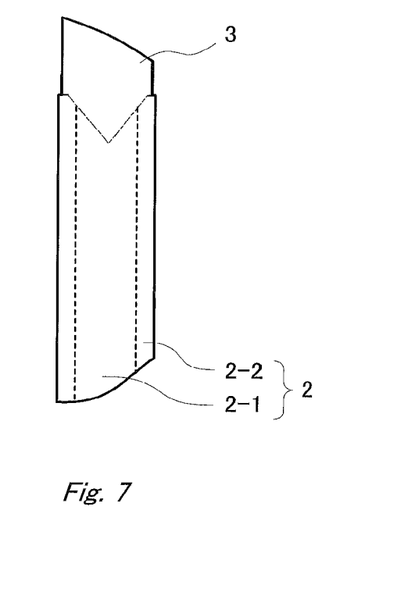
FIG. 7 is a cross-sectional view for explaining another laser light irradiation apparatus.

In the present embodiment, a case in which the end face of the optical fiber 2 is cut into a spherical surface shape is described. However, the shape of the end face is not particularly limited as long as being able to result in a light condensing effect. For example, the end face may be formed in a conical shape as illustrated in FIG. 7, or may be formed in the shape of an aspherical lens.

Fifth Embodiment

A laser light irradiation apparatus according to a fifth embodiment will be described with reference to the drawings. Members having functions similar to those in the embodiments described above are denoted by the same reference characters, and the detailed descriptions thereof are omitted.

Figure 8:
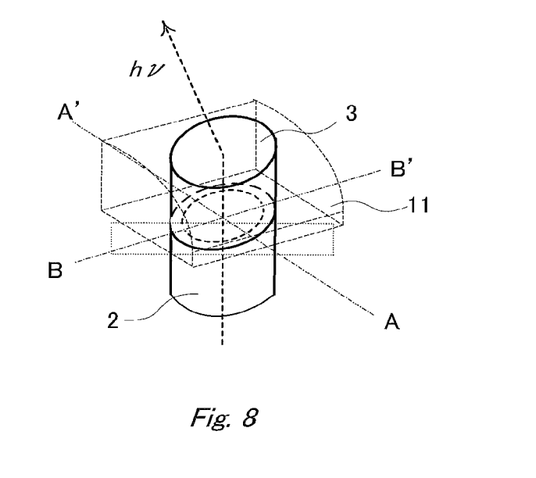
FIG. 8 is a conceptual diagram for explaining a condensing lens in a laser light irradiation apparatus according to a fifth embodiment.

FIG. 8 is a conceptual diagram for explaining a condensing lens 3 in the laser light irradiation apparatus according to the present embodiment. As illustrated in FIG. 8, the condensing lens 3 has a shape cut from a cylindrical lens 11 (illustrated by broken lines), and the shape of the light emission face of the condensing lens 3 is a cylindrical lens shape in the present embodiment. The cylindrical lens 11 has a light condensing effect in an A-A' direction while having no light condensing effect in a B-B' direction. By using such a cylindrical lens 11, the beam of laser light can be allowed to have an elliptical shape that is longer in the B-B' direction, i.e., has an aspect ratio that is not 1. Irradiation of the portion to be processed, closer to A', of such a cylindrical lens 11 with laser light allows a laterally longer light beam to be a longitudinally longer light beam with which irradiation is performed. In other words, when the spot of laser light is laterally longer on a face perpendicular to the travelling direction of the laser light, its aspect ratio can approach 1 on a face that is not perpendicular to the travelling direction of the laser light.

Thus, in accordance with the present embodiment, the shape of a laser spot with which irradiation of the portion 9 to be processed is performed can be allowed to approach a perfectly circular shape, and the density of energy with which irradiation is performed can be increased. In other words, laser light with which irradiation is performed from the optical fiber 2 is not inclined at 90° by the condensing lens 3, and therefore, the shape of a laser spot may become elliptical when the light does not come into a focus on the portion 9 to be processed. Because an irradiated area is increased due to the elliptical shape of the laser spot, the power density of laser may be decreased on the portion 9 to be processed, thereby resulting in the insufficient effect of improving a stress by laser peening. In contrast, in accordance with the present embodiment, the shape of the light emission face of the condensing lens 3 has a cylindrical lens shape, the shape of a laser spot with which irradiation of the portion 9 to be processed is performed is improved, the shape of the laser spot can be allowed to approach a perfectly circular shape, and therefore, the density of energy with which irradiation is performed can be increased.

The present embodiment can also be combined with the configurations of the other embodiments described above. For example, the present embodiment can also be combined with the optical fiber lens 10 according to the second embodiment, with such an optical fiber having an inclined end face with an obliquely processed end as described in the third embodiment, or with an optical fiber with an end formed into a concave shape as described in the fourth embodiment. The performance of condensing laser light can be further enhanced by combining such aspects.

In the laser light irradiation apparatus according to the present embodiment, a light path from the laser light emission face of the optical fiber 2 to the portion 9 to be processed is preferably in a liquid in the case of performing processing by laser peening. In general, a state in which the portion to be processed and the laser light emission face are buried in water, i.e., flooded, is desirable. In such a case, it is preferable to use a material of which the refractive index is higher than that of water (having a refractive index of about 1.33) as the material of the condensing lens 3.

The laser light irradiation apparatus according to each of the above-described embodiments is useful in the case of processing a narrow portion such as the gap between the nozzle 7 of the upper lid 6 of the nuclear reactor and the thermal sleeve 8 by laser peening, as described above. Therefore, it is preferable that the optical fiber 2, the condensing lens 3 disposed on its leading edge, and the like have small sizes. Specifically, the maximum dimension (hereinafter simply referred to as "major diameter") of a cross section viewed from the direction of the central axis of the optical fiber 2 is preferably 5 mm or less, more preferably 3 mm or less, and most preferably 2 mm or less. The minimum dimension (hereinafter simply referred to as "minor diameter") of a cross section viewed from the direction of the central axis of the optical fiber 2 is smaller than the diameter of the optical fiber 2, and is, for example, 1 to 5 mm. The laser light irradiation apparatus according to each of the above-described embodiments can be effectively used for processing, e.g., the narrow portion between a nozzle and a thermal sleeve, for example, in a nuclear reactor by laser peening because the optical fiber 2, the condensing lens 3 disposed on its leading edge, and the like can have such small sizes.

Sixth Embodiment

A laser light irradiation apparatus according to a sixth embodiment will be described with reference to the drawings. Members having functions similar to those in the embodiments described above are denoted by the same reference characters, and the detailed descriptions thereof are omitted.

In the first to sixth embodiments, the inclination angle of laser light is set at more than 0° and less than 90°, whereby the spacing between a condensing lens 3 and a portion 9 to be processed is increased to reduce a shock received by the condensing lens during processing. However, the position of the condensing lens may deviate from the predetermined position thereof due to, e.g., a variation in the spacing of a narrow portion when the laser light irradiation apparatus 1 is inserted into the narrow portion, and processing is performed. In such a case, the distance between the condensing lens and the portion to be processed deviates from a set distance. When the distance between the condensing lens and the portion to be processed is decreased, the condensing lens may be damaged by a shock. It is impossible to obtain a predetermined shock, and the portion to be processed may be insufficiently processed when the distance between the condensing lens and the portion to be processed is increased.

In order to prevent such problems, the laser light irradiation apparatus according to the sixth embodiment further includes a positioning mechanism for placing the condensing lens at the predetermined position.

Figure 9:
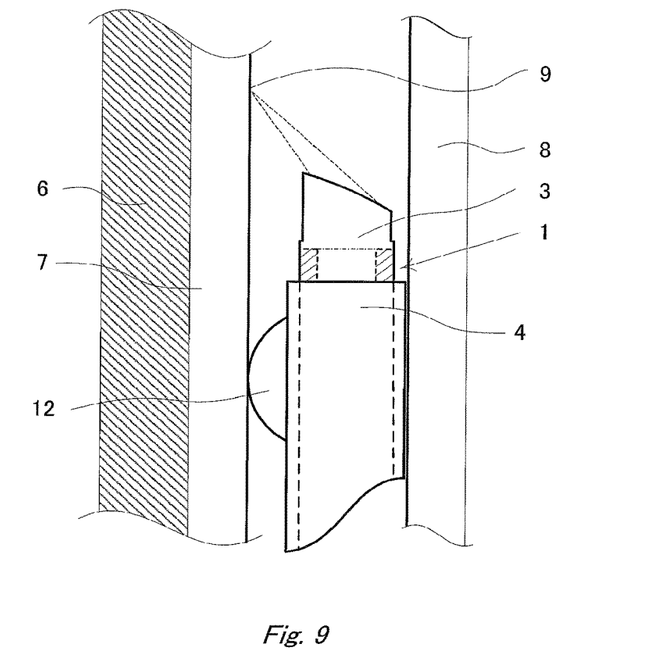
FIG. 9 is a schematic cross-sectional view illustrating the configuration of a laser light irradiation apparatus according to a sixth embodiment.
Figure 10:
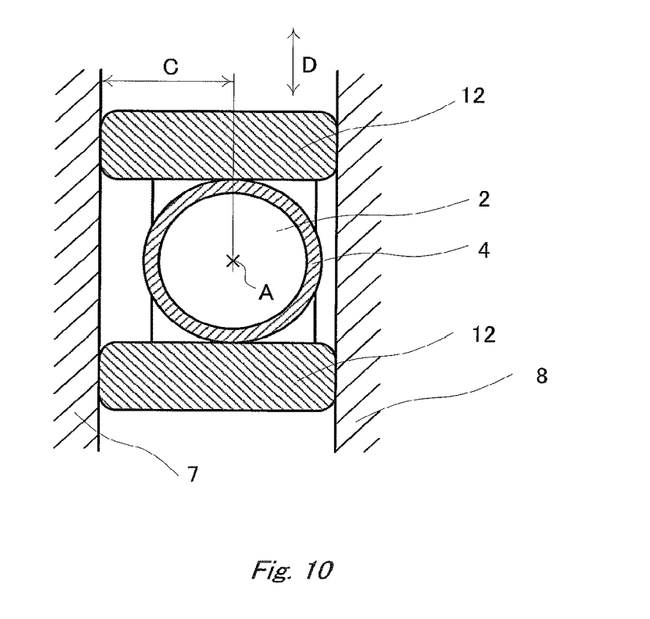
FIG. 10 is a schematic cross-sectional view of a positioning mechanism portion in the laser light irradiation apparatus according to the sixth embodiment.

The laser irradiation apparatus 1 includes mechanisms 12 (hereinafter referred to as "positioning mechanisms") for positioning the relative position of the condensing lens 3 with respect to the inner wall of a nozzle 7 which is a target face. As illustrated in FIG. 9 and FIG. 10, the positioning mechanisms 12 come in contact with at least the inner wall of the nozzle 7, closer to a target to be processed, in a guide 4, and move integrally with the guide 4. The dimensions and the like of the positioning mechanisms 12 are formed so that the positioning mechanisms 12 come in contact with both of the inner wall of the nozzle 7 and the outer wall of a thermal sleeve 8 which is the facing face thereof.

In the present embodiment, the positioning mechanisms 12 are disposed on both sides in a direction (indicated by an arrow C in the drawing) along the inner wall of the nozzle 7 and the outer wall of the thermal sleeve 8 so that an optical fiber 2 and the guide 4 are put between the positioning mechanisms 12, as illustrated in FIG. 10.

As a result, the positioning mechanisms 12 position the laser irradiation apparatus so that the distance between the inner wall of a nozzle 6 which is the target face and the optical axis center A of the condensing lens 3 is a predetermined distance (indicated by a dimension D in the drawing). The inclusion of the positioning mechanism in the laser irradiation apparatus as described above enables efficient laser peening processing to be performed while preventing damage to the condensing lens.

Seventh Embodiment

The configuration of a laser irradiation apparatus of a seventh embodiment will be described with reference to FIG. 11. Components that are generally common to those in the first embodiment are denoted by the same reference characters, and the descriptions thereof are omitted.

Figure 11:
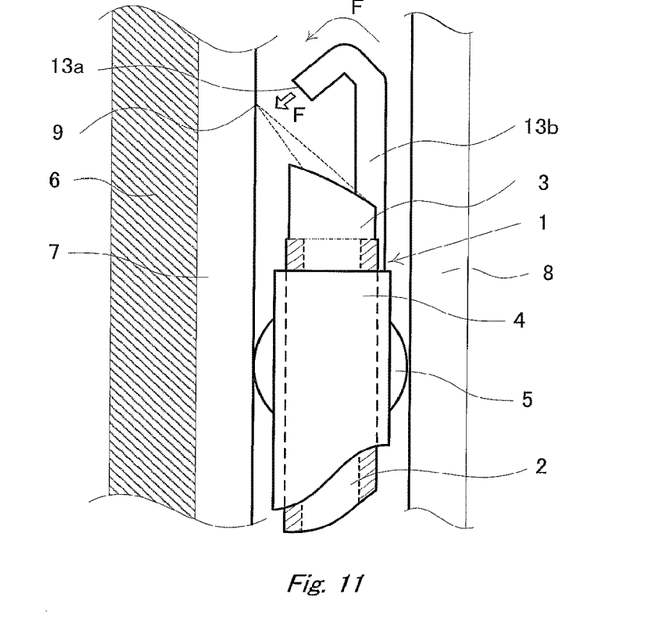
FIG. 11 is a schematic cross-sectional view illustrating the configuration of a laser light irradiation apparatus according to a seventh embodiment.

As illustrated in FIG. 11, the laser irradiation apparatus of the present embodiment includes a mechanism 13 (hereinafter referred to as "liquid ejection mechanism") for ejecting a transparent liquid (water) toward the vicinity of a portion 9 to be processed with laser light, and the light path of laser light emitted from a condensing lens 3. The liquid ejection mechanism 13, which is joined to the guide 4 described above, moves integrally with the guide 4, an optical fiber 2, and the condensing lens 3.

The liquid ejection mechanism 13 includes: a liquid ejection port 13a placed axially in front of the condensing lens; and an axially stretched pipe 13b to which a transparent liquid F is supplied from a liquid supply source which is not illustrated, and which sends the liquid to the liquid ejection port 13a. The liquid passed through the axially stretched pipe 13b is discharged from the liquid ejection port 13a toward the portion 9 to be processed.

In accordance with the laser irradiation apparatus of the present embodiment, the transparent liquid F can be supplied to an irradiation region irradiated with laser light in the target face of the portion 9 to be processed even when the portion 9 to be processed is exposed to air. As a result, a residual stress in the vicinity of the irradiation region can be changed from a tensile stress to a compressive stress by favorably applying a shock wave to the portion to be processed.

Eighth Embodiment

The configuration of a laser irradiation apparatus of an eighth embodiment will be described with reference to FIG. 12. Components that are generally common to those in the first embodiment are denoted by the same reference characters, and the descriptions thereof are omitted.

Figure 12:
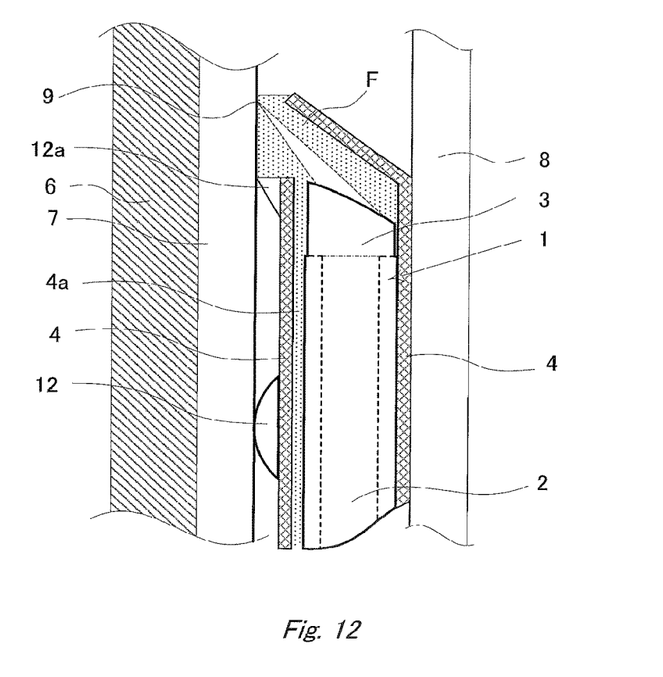
FIG. 12 is a schematic cross-sectional view illustrating the configuration of a laser light irradiation apparatus according to an eighth embodiment.

As illustrated in FIG. 12, in the laser irradiation apparatus of the present embodiment, a guide 4 joined to an optical fiber includes a liquid passage 4a into which a transparent liquid flows. The guide 4 is configured to guide the liquid that flows through the liquid passage 4a, to a portion 9 to be processed. The guide 4 includes positioning mechanisms 12 and 12a, which are formed to be able to appropriately adjust the position of a condensing lens 3.

The guide 4 has a generally cylindrical shape containing the optical fiber 2. In the present embodiment, the liquid passage 4a is formed between the inner surface of the guide 4 and the optical fiber 2. The condensing lens 3 is placed in the interior of the cylindrical portion.

In addition, the guide 4 includes a portion which deflects the flow of the liquid from the liquid passage 4a to the portion 9 to be processed. The transparent liquid F supplied from a liquid supply apparatus which is not illustrated is supplied to the portion 9 to be processed.

In accordance with the laser irradiation apparatus of the present embodiment, the transparent liquid can be supplied to the portion 9 to be processed through the liquid passage 4a, and a light path from the condensing lens 3 to the portion 9 to be processed can be covered with the transparent liquid even when a target face is exposed to air.

Ninth Embodiment

Figure 13:
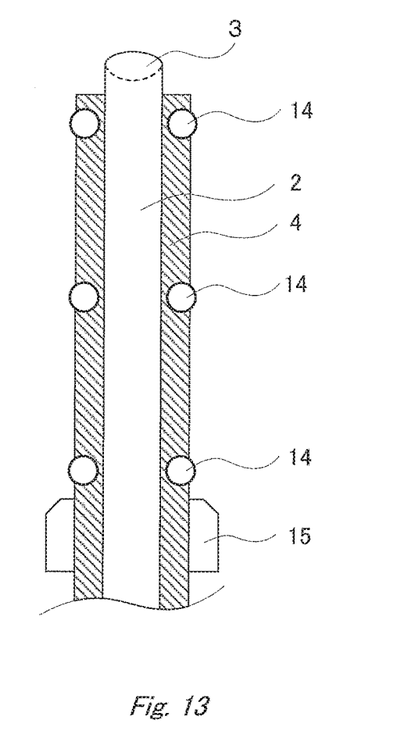
FIG. 13 is a partial cross-sectional view illustrating detectors disposed in a guide, and the peripheral configuration thereof, in a laser light irradiation apparatus according to a ninth embodiment.

A laser irradiation apparatus of a ninth embodiment will be described with reference to FIGS. 13 and 14. FIG. 13 is a partial cross-sectional view illustrating detectors disposed in a guide, and the peripheral configuration thereof, in the laser irradiation apparatus of the present embodiment. In FIG. 13, the cross section of only the guide is illustrated to facilitate interpretation.

Figure 14:
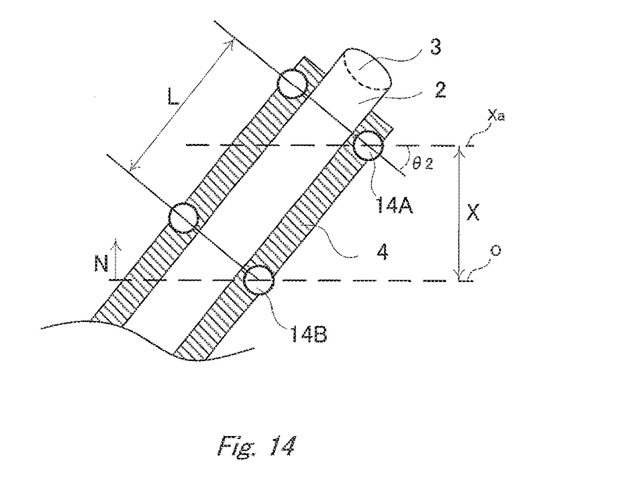
FIG. 14 is an explanatory drawing for explaining a technique for detecting the inclinations of an optical fiber and the guide by a plurality of detectors in the laser light irradiation apparatus according to the ninth embodiment.

FIG. 14 is an explanatory drawing for explaining a technique for detecting the inclinations of an optical fiber and the guide by a plurality of detectors. Components that are generally common to those in the first embodiment are denoted by the same reference characters, and the descriptions thereof are omitted.

As illustrated in FIG. 13, the plural detectors 14 for detecting the moving amount of the guide 4 is disposed in the guide 4 in the laser irradiation apparatus of the present embodiment. The detectors 14 are spherical. At least one of the detectors is placed in the vicinity of a condensing lens 3. In the present embodiment, the plural detectors 14 are aligned axially at predetermined spacings.

In the present embodiment, each detector 14 is configured to be able to rotate around the guide 4. Each detector 14, of which a part protrudes radially from the outer peripheral surface of the guide 4 to the outside, is configured to be able to come in contact with a target face or a facing face.

The detectors 14 of the present embodiment come in contact with the inner wall of a nozzle 7, thereby functioning as positioning mechanisms for allowing the distance between a portion 9 to be processed and the condensing lens 3 to be a predetermined distance. In addition to the detectors 14, positioning mechanisms 12 (see FIG. 9) similar to those in the sixth embodiment may be included. Members 15 between which the guide 4 is put, and which is used for axially driving the guide 4 may also be formed on the outer peripheral surface of the guide 4.

As illustrated in FIG. 1, when the laser irradiation apparatus 1 is inserted between the inner wall and the outer wall, some of the plural detectors 14 aligned in the guide 4 come in contact with either of the inner and outer walls. The detectors 14 that come in contact with the inner wall or the outer wall are rotated by driving the laser irradiation apparatus.

In the present embodiment, each detector 14 has the function of detecting its own rotation amount (rotation angle), and is formed as a so-called track ball. The laser irradiation apparatus 1 includes a processing position calculation mechanism (not illustrated) which calculates the moving amount of the guide 4 based on the rotation amount of each detector 14, and calculates the position of the condensing lens 3 on the leading edge of the optical fiber 2, or the position of the portion 9 to be processed based on the moving amount.

The laser irradiation apparatus 1 can calculate the inclinations of the optical fiber 2 and the guide 4 based on the rotation amounts of the plural detectors 14.

When the guide 4 is inserted into the interior of the nozzle 7 in a direction indicated by an arrow N in FIG. 14, the detector 14A closer to the condensing lens 3 is first rotated, and the position (indicated by a broken line Xa in FIG. 14) of the detector 14A in the direction indicated by the arrow N (axial direction of nozzle 7) is calculated. When the guide 4 is further inserted in the direction indicated by the arrow N, the detector 14B next to the detector 14A in the axial direction of the optical fiber 2 is inserted into the interior of the nozzle 7, and is rotated, and the position (indicated by a broken line O in the drawing) of the detector 14B is calculated.

As a result, the distance X (indicated by a dimension X in the drawing) between the detector 14A and the detector 14B in the direction indicated by the arrow N can be determined. Assuming that the distance between the detector 14B and the detector 14A in the axial direction is L, the inclination θ2 of the guide 4 can be determined by the following Expression (1):

$$\theta2 = \arccos(X/L). \quad \text{Expression (1):}$$

In such a manner, the laser irradiation apparatus 1 of the present embodiment can determine not only the position of the condensing lens 3 but also the inclination of the optical fiber 2.

Other Embodiment

In each of the embodiments described above, the laser irradiation apparatus carries out the laser peening by irradiating the irradiation region with laser light in a state in which at least the irradiation region in the target face to be processed is covered with the transparent liquid. However, aspects of the laser processing according to the present invention are not limited thereto. For example, irradiation with laser light may be performed in a state in which an irradiation region in a target face is covered with a gas.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

The invention claimed is:

1. A laser light irradiation apparatus, comprising:
   an optical fiber through which laser light is guided;
   a condensing lens that is placed on one end of said optical fiber, said condensing lens and said optical fiber defining a light path of said laser light;
   a guide that retains said optical fiber; and
   a movement mechanism for changing a position of said optical fiber,
   wherein the light path of said laser light guided through said optical fiber is emitted at an angle changed to more than 0° and less than 90° with respect to a central axis of said optical fiber by said condensing lens.

2. The apparatus according to claim 1, wherein
   said condensing lens is a part of an optical lens having a diameter larger than a diameter of a core of said optical fiber; and
   said central axis of said optical fiber and an optical axis of said optical lens do not correspond with each other.

3. The apparatus according to claim 1, wherein
   an end face, closer to said condensing lens, of said optical fiber is cut obliquely with respect to the central axis of said optical fiber.

4. The apparatus according to claim 1, wherein
   said optical fiber and said condensing lens are joined to each other via an optical fiber lens.

5. The apparatus according to claim 1, wherein
   an end face, closer to said condensing lens, of said optical fiber is cut concavely.

6. The apparatus according to claim 1, further comprising:
   a positioning mechanism which determines a position of said condensing lens so that a distance between said condensing lens and a portion to be processed, irradiated with said laser light, is a predetermined distance.

7. The apparatus according to claim 1, further comprising:
   a liquid ejection mechanism which ejects a liquid toward a portion to be processed, irradiated with said laser light.

8. The apparatus according to claim 1, wherein
   said guide comprises a liquid passage into which a liquid flows, and is configured to guide a liquid, supplied from a liquid supply mechanism, to a portion to be processed, irradiated with said laser light.

9. The apparatus according to claim 1, further comprising:
   a detector which can detect a moving amount of said guide; and
   a processing position calculation mechanism which calculates a position of a portion to be processed, irradiated with said laser light, based on the moving amount of said guide detected by said detector.

10. A laser peening treatment method, comprising:
    performing processing by irradiating a member to be treated, existing in water, with said laser light using said laser light irradiation apparatus according to claim 1.

11. The method according to claim 10, wherein
    said member to be treated is a member included in a nuclear reactor.

* * * * *